(12) United States Patent
Tagore-Brage et al.

(10) Patent No.: US 7,164,677 B2
(45) Date of Patent: Jan. 16, 2007

(54) DATA SWITCHING SYSTEM

(75) Inventors: Jens P. Tagore-Brage, Frederiksberg (DK); Ole C. Andersen, Herlev (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 988 days.

(21) Appl. No.: 10/138,496

(22) Filed: May 6, 2002

(65) Prior Publication Data

US 2003/0035426 A1  Feb. 20, 2003

(51) Int. Cl.
*H04L 12/00* (2006.01)
*H04L 12/28* (2006.01)

(52) U.S. Cl. .................. 370/386; 370/422
(58) Field of Classification Search ........... 370/390, 370/392, 419, 386, 420, 422
See application file for complete search history.

(56) References Cited

U.S. PATENT DOCUMENTS

| | | | | |
|---|---|---|---|---|
| 5,166,926 A | * | 11/1992 | Cisneros et al. | 370/392 |
| 5,404,352 A | * | 4/1995 | Pauwels et al. | 370/390 |
| 5,948,067 A | * | 9/1999 | Caldara et al. | 709/236 |
| 6,031,838 A | * | 2/2000 | Okabe et al. | 370/395.6 |
| 2002/0024928 A1 | * | 2/2002 | Furuichi | 370/218 |

* cited by examiner

*Primary Examiner*—Ricky Q. Ngo
*Assistant Examiner*—Warner Wong
(74) *Attorney, Agent, or Firm*—Christie, Parker & Hale, LLP

(57) ABSTRACT

A data switching system comprising one or more I/O elements each comprising a plurality of first input/output ports adapted to receive and transmit data packets or cells to and from an external data network, and one or more second input/output ports adapted to receive and transmit data packets or cells, means for providing first routing information relating to at least one packet or cell to be output from one or more of the second port(s), each I/O element being adapted to transfer data packets or cells between the first ports and the second port(s) and to output data packets or cells comprising corresponding first routing information from the second port(s), a switching element having a plurality of third input/output ports being adapted to receive and transmit data packets or cells, the switching element comprising means for receiving on a third port a data packet or cell as well as the corresponding first routing information, determining, on the basis of the first routing information, port information indicating from which of the third ports the data packet or cell is to be output from the switching element, and outputting the data packet or cell from the third port(s) indicated by the port information, a second port of each I/O element being connected to a third port of the switching element.

33 Claims, 5 Drawing Sheets

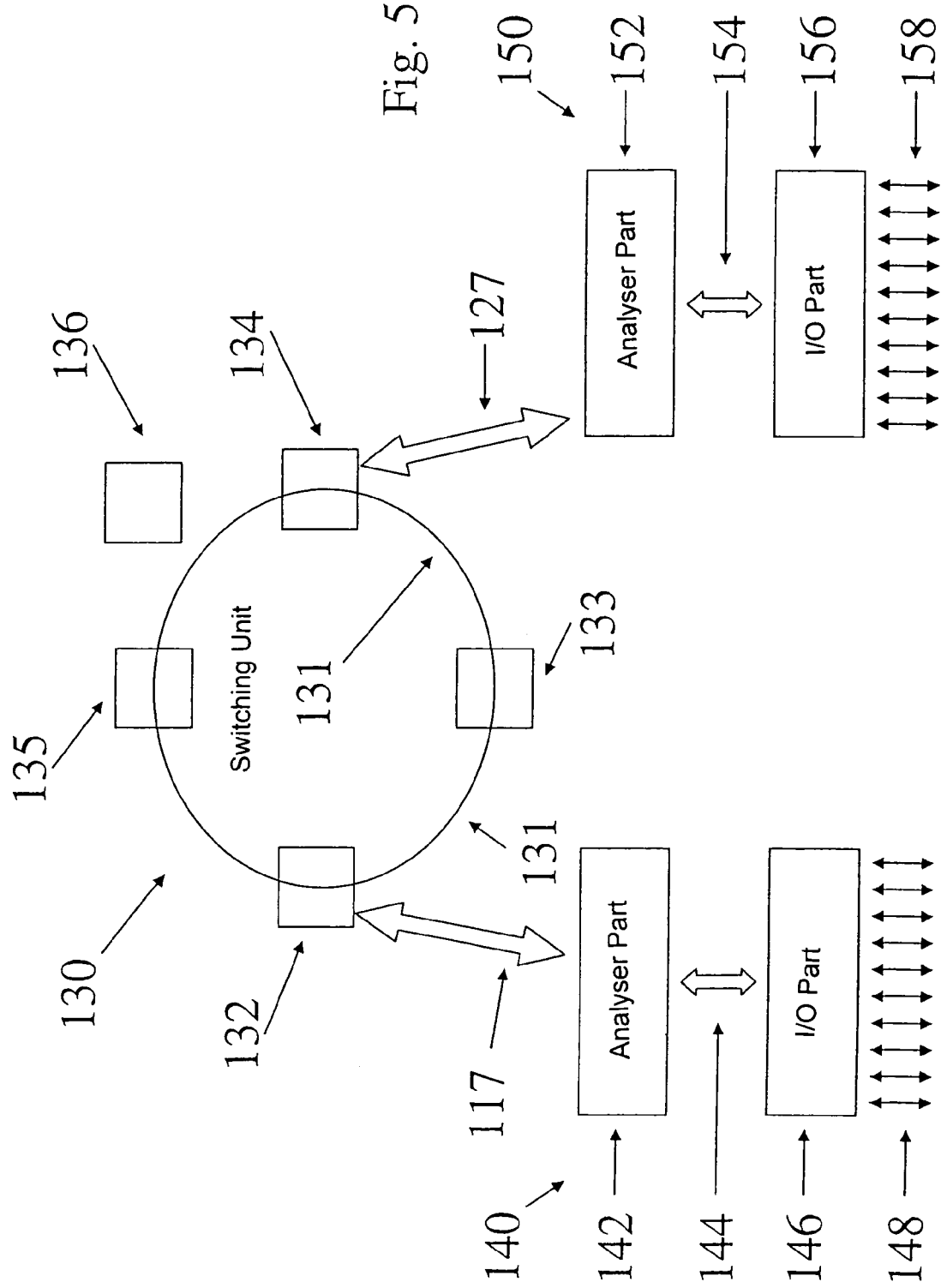

DATA SWITCHING SYSTEM

The present invention relates to a data switching system and in particular a stackable switching system built from standalone modules.

Stackable switching systems made of stand-alone systems are known. Such systems, however, do not experience the synergy of e.g. better analysers in part of the system. Thus, the result of a higher-level analysis performed in one part of the system may not be utilised all the way through the system if part thereof operates on the basis of its own lower level analysis.

U.S. Pat. No. 6,301,257 relates to source routing where a first switch floods a first packet to a destination to all switches connected to the first switch. All switches which are to receive the packet responds with switch ID and port number which is stored in a memory of the first switch (as a destination tag) and is subsequently prepended to packets for the same destination. In this manner, the subsequent switches need not perform look-up when receiving packets having a prepended destination tag.

EP-A-0 996 256 and 1 003 306 relate to two modes of operating a number of switches in relation to each other. One mode is a loop mode where an out-of-band pretag is provided with the ID of the originating switch so that a packet may be identified if it returns to the originator. The other mode relates to an in-band pretag comprising the ingress port number of the receiving switch and the egress port number of the backbone switch in order for that switch to merely transmit the packet, including the pretag if desired, from the port indicated. In this mode, no look-up is performed in the backbone switch. The in-band pretag completely fills and fully replaces the preamble and start-of-frame delimiter of the incoming packet. This preamble and start-of-frame delimiter are re-generated before outputting from this stacked switch.

U.S. Pat. No. 4,956,841 describes source routing through switches using arrows (routing information) for each hop and which are partly removed at each hop, with additional information to a hop server in order to facilitate multicasting without replicating packets.

Normally, each element in a networking system will perform its own analysis on the basis of the contents of the data packet or cell.

The present invention relates to a system where the analysis result of one part is used for switching in other parts of the system thus utilising the information provided.

In normal source routing systems where output port information is forwarded to a next switch, link swapping at that next switch will require a changing of the tables of the other switches in that a new output port number is required. The present invention relates to a manner of obviating that problem.

In a first aspect, the invention relates to a data switching system comprising:
  one or more I/O elements each comprising:
    a plurality of first input/output ports adapted to receive and transmit data packets or cells to and from an external data network, and
    one or more second input/output ports adapted to receive and transmit data packets or cells,
  means for providing first routing information relating to at least one packet or cell to be output from one or more of the second port(s), each I/O element being adapted to transfer data packets or cells between the first ports and the second port(s) and to output data packets or cells comprising corresponding first routing information from the second port(s),
  a switching element having a plurality of third input/output ports being adapted to receive and transmit data packets or cells, the switching element comprising means for:
    receiving on a third port a data packet or cell as well as the corresponding first routing information,
    determining, on the basis of the first routing information, port information indicating from which of the third ports the data packet or cell is to be output from the switching element, and
    outputting the data packet or cell from the third port(s) indicated by the port information, a second port of each I/O element being connected to a third port of the switching element.

In the present context, the first information is not directly the port identity but information used for deriving that identity. This deriving may be using the first information as a key in a table or as a variable in a calculation resulting in the identity. An important aspect is that after a link swapping, the same first information should result in a different port identity—whereby the determination of the port information should be based not solely on the first information. When locally held information is also used in the determination, a link swapping at the switching element may be taken into account without requiring a change in the routing information from the I/O element.

Also, if the same information is used for communication in two directions (such as between the same two entities), other information, such as e.g. input port ID, may be provided in order to differ between these two communications.

In the present context, an I/O port may be separated into two physically separate ports. However, these ports will normally be said to be part of the same bi-directional link.

The external data network may be anything from a single computer to a large network, such as the WWW. Normally, the individual ports of a switching system will interconnect different parts of the network. Thus, different first ports will normally connect to different (otherwise non-connected) parts of the network.

The fact that the first information is fed to the switching element will ensure that a fast switching element but with e.g. a low level or non-optimised analyser will still be able to perform high level switching. Also, if a new I/O element is added to the system, the analyser (which may be better than any analyser in the switching element) will increase the quality of switching of data entering the system via the new I/O element.

In fact, in this set-up, any analyser of the switching element need not be utilised. However, the look-up engine may be re-used with a slightly different operation.

Preferably, information is not only provided as to which port of the switching element is to output the data packet, the providing means is also adapted to, from a data packet or cell received in one I/O element from the external data network, provide second information relating to from which of the first ports of another I/O element, receiving the data packet or cell from an indicated third port of the switching element, the data packet or cell is to be output. The second information may be (part of or all of) the first information and the deriving or determination of that information may be as according to this first aspect of the invention. In fact, the first information may be provided at an origin of the data packet or cell (or later on in the path) and may be used by a number of data switching/routing elements before maybe being removed from the packet/cell and delivered to a receiver of the packet/cell. Thus, the same information may be used for routing the packet/cell at least part of the path.

During communication between e.g. two communicating end users or networking elements, using two different types of first information will facilitate actually using different paths for data of different priority or type. Thus, a faster/shorter/more expensive path may be used only for data requiring this.

Thus, the full switching/routing path through the system may be derived at the beginning.

In this situation, it is naturally preferred that the second information is transmitted from the one I/O element to the other I/O element in order for the knowledge to be used. In fact, preferably, the second information is introduced into the packet or cell by the one I/O element, the other I/O element being adapted to derive the second information from the packet or cell. In that manner, the second information may be transmitted from the one I/O element to the other I/O element via the same links as the actual data packet or frame.

For the same reasons, it is preferred that the first information is introduced into the data packet or cell before transmission to the switching element.

Preferably, the first and any second information is added to the data packet or cell. In one situation, the information is added as at least part of a preamble of the data packet or cell comprising a preamble, a header, and a payload. In another situation, the information is added as at least part of a header of the data packet or cell comprising a preamble, a header, and a payload. A particular situation is one where the information is added as a VLAN tag in an Ethernet packet.

In general, it is preferred that information is added as at least part of a preamble of the data packet or cell. This is due to the fact that any alternation of a payload or header part of a packet or cell may require a recalculation of e.g. a CRC—which is unnecessary and time-consuming work. Also, the preamble is normally that part of a packet or cell, which reaches a destination first, which means that the analysis of the routing/switching information may begin even at a stage where not all of the packet or cell has been received.

A particular embodiment is one where the present switching element is able to provide cut through operation where the packet or cell is switched with no or very little storage. In that situation, providing the first information and a quick manner of determining the output port(s)—together with the fact that the first information is provided in the preamble or header—facilitates fast switching or even cut through operation.

A number of standards exist for data transport, such as within Ethernet data transport. According to such standards, the preamble portion has one of one or more standardised "contents" or fields. Introducing additional information in the preamble may bring an otherwise standard packet or cell to not fulfilling the standard anymore. However, preferably at least the ports transferring information from an I/O element to the switching element may dispense from the standardisation requirement in that data on such links is not required to be "understandable" by other data transport equipment.

Preferred standards for data packets or cells received from or transmitted to the external data network may be the Ethernet standard, IEEE 802.1, 802.3, Apple Talk, Token Ring, Frame Relay, and FDDI.

Preferably, at least one I/O element is adapted to transmit data packets or cells between all first and second ports and wherein the providing means are adapted to provide third information, from a data packet or cell received in the I/O element from the external data network, relating to whether to:

output the packet or cell from one of the first ports of the I/O element and/or output the packet or cell to the switching element via a second port of the I/O element.

Thus, that I/O element may be a switch having a number of first ports and an uplink with a higher bit rate to a switch being able to handle the higher bit rate and to feed data from one I/O element to another I/O element.

Naturally, the I/O elements may have more than one second port which means that multiple switching elements may be provided—or the I/O elements may communicate with another computer or networking element.

In order for the present system to be truly stackable and for the individual I/O elements or switching element to be used in a number of constellations, it is desired that each I/O element comprises a providing means. In that situation, the I/O elements may be used as standalone elements.

The I/O element may comprise an arbiter function for performing arbitration when the traffic desired exceeds a certain amount. This arbiter function, in the preferred embodiment, determines only the switching order on the cross bar.

Also, preferably, each of the first, second, and third ports comprises an I/O means for transmitting and receiving data packets or cells conforming to a predetermined standard, the I/O means of the second and third ports being adapted to operate in one of two modes, one mode being transmission and reception of data packets or cells conforming to the predetermined standard and the other mode being transmission and reception of data packets or cells comprising the first and/or the second information—such as data packets or cells which, apart from the first and/or second information, conforms to the predetermined standard. This again makes the individual I/O elements and switching element useful outside the present system.

I/O means of this type could, in Ethernet communication, be a so-called MAC, which in the one manner of operation would ensure that, the packets or cells transmitted/received conform to one of the Ethernet/IEEE standards and in the other manner of operation "dispense" for the additional information (preferably in the header of the packet or cell).

In a preferred embodiment, the determining means of the switching element comprises means for providing, on the basis of information other than any first information of a data packet or cell received, information relating to from which of the third ports to output the data packet or cell. In one embodiment, the information other than any first information may be normal addressing information as present in the packet or cell. In that situation, the switching element will be able to switch also normal packets or cells not having any first information. Also, the switching element may be configured to or instructed to not switch a given packet or cell (or all packet or cells) according to any first information present therein but according to the other information. In this manner, the switching element will also be useful as a standalone switch.

In the above embodiment, the providing means of the switching element preferably comprises:

a memory means comprising a number of entries each comprising routing information and output port information, and means for:
- a comparing first routing information or other information from a received packet or cell to information in one or more of the entries in the memory,
- identifying one or more entries having corresponding routing information, and
- providing output port information relating to the identified entry/entries.

The memory means may be structured as a table. This table may have as an entry data of the type as the first information (may be a simple number)—or information derived therefrom—and an output (entry) being e.g. a bit-map identifying the output port(s).

The actual identifying step may be a step where identical entries are identified—or where e.g. a longest prefix matching is performed where the best fit (the longest part of the entry and the search key) is identified.

The present identifying step may be a standard look-up in a table.

In accordance with the present embodiment, it may be ensured that this identifying step always ends with at least one entry identified. One manner of obtaining this is when the means for providing the first routing information relating to a data packet or cell is adapted to provide first routing information being an element selected from a predetermined group of information elements comprising a maximum number of elements being smaller than or identical to the number of entries of the memory means of the switching element.

Thus, it is ensured that each piece of first information can have a corresponding entry. This is in contrast to normal routing look-up tables where the number of possible addresses vastly exceeds the number of entries in the tables. In that manner, hashing, ageing etc. are processes used to obtain an acceptable utilization of the entries.

In order to be able to handle both packets having the first routing information and packets to be switched in a standard manner, in one embodiment, the switching element comprises means for determining whether a received data packet or cell comprises first routing information and for, in that situation, deriving the first routing information and otherwise deriving other information from the packet or cell, wherein the memory means of the switching element is divided into a first group of entries wherein any entry/entries having routing information corresponding to first routing information is/are identified and a second group of entries wherein any entry/entries having routing information corresponding to other routing information is/are identified.

In that situation, preferably, the means for providing the first routing information relating to a data packet or cell is adapted to provide first routing information being an element selected from a predetermined group of information elements comprising a maximum number of elements being smaller than or identical to the number of entries of the first group of entries of the memory means of the switching element.

In the preferred embodiment, a data packet or cell received from the external network is subdivided into a number of fixed-size cells, which are then handled/switched in the individual I/O element and switching element. However, preferably the packet or cell—or rather a packet or cell—is generated for transmission between the elements. In this manner, the addition of any information (first and optionally second) to the packet or cell will not change the size of any fixed-size cell—but it may change the number of fixed-size cells into which the packet or cell is divided.

The actual I/O elements may be simple multiplexers/demultiplexers simply transmitting the data between the first and second ports—or they may have a more intelligent functioning such as routers or switches.

Preferably:
- the first input/output ports are adapted to receive and transmit data packets or cells at a first bit rate to and from the external data network and
- the second input/output port(s) are adapted to receive and transmit data packets or cells at a second bit rate being larger than the first bit rate, and
- the third input/output ports are adapted to receive and transmit data packets or cells at the second bit rate.

Standard PHY's will be able to actually operate on a number of different bit rates, such as 10 Mb/s, 100 Mb/s and 1 Gb/s. The first bit rate will normally be one of these bit rates.

The overall function of the I/O elements will be to gather data from the first ports and fed these to e.g. an uplink which has a larger bandwidth for switching in a large bandwidth switching element.

Thus, normally, the second bit rate would be higher than e.g. 1 Gb/s, such as 10 Gb/s or higher. However, the uplink may operate on a lower bit rate—depending of the bandwidth required and the set-up of the remaining part of the data network.

Finally, preferably the communication between the I/O elements and the switching element takes place via a detachable data communication link (electrical, wireless or optical) in order for the individual I/O elements and the switching element to be useable by themselves.

A second aspect of the invention relates to a method of switching data, the method comprising:
- receiving a data packet or cell in an I/O element comprising:
  - a plurality of first input/output ports adapted to receive and transmit data packets or cells to and from an external data network, and
  - one or more second input/output ports adapted to receive and transmit data packets or cells, the I/O element being adapted to transfer data packets or cells between the first ports and the second port(s),
- providing first routing information relating to at least one packet or cell to be output from one or more of the second port(s),
- outputting the data packets or cells comprising the first routing information from one or more second port(s) of the I/O element,
- receiving the output data packet or cell and first routing information in a switching element having a plurality of third input/output ports being adapted to receive and transmit data packets or cells,
- determining, on the basis of the first routing information, port information indicating from which of the third ports the data packet or cell is to be output from the switching element, and
- outputting the data packet or cell from the third port(s) indicated by the port information.

Preferably, the providing step also comprises providing, from a data packet or cell received in the I/O element from the external data network, second information relating to from which of the first ports of another I/O element, receiving the data packet or cell from an indicated third port of the switching element, the data packet or cell is to be output.

In that situation, preferably, the second information is transmitted from the one I/O element to the other I/O element.

Also, preferably, the second information is introduced into the packet or cell by the one I/O element, the other I/O element deriving the second information from the packet or cell. Thus, the other I/O element will operate accordingly.

Also, at least one I/O element may be adapted to transmit data packets or cells between all first and second ports and wherein the providing means may provide third information, from a data packet or cell received in the I/O element from the external data network, relating to whether to:
- output the packet or cell from one of the first ports of the I/O element and/or
- output the packet or cell to the switching element via a second port of the I/O element. In that situation, the I/O means will act accordingly.

Preferably, the method further comprises the step of adding the first and any second information to the data packet or cell. This adding step may comprise adding the information as at least part of a preamble of the data packet or cell comprising a preamble, a header, and a payload. Alternatively, the adding step could comprise adding the information as at least part of header of the data packet or cell comprising a preamble, a header, and a payload.

The present method may comprise the step of I/O means of each of the first, second, and third ports transmitting and receiving data packets or cells conforming to a predetermined standard. In that situation, a further step may be provided of the I/O means of the second and third ports operating in one of two modes, one mode being transmission and reception of data packets or cells conforming to the predetermined standard and the other mode being transmission and reception of data packets or cells comprising the first and/or second information.

The determining means of the switching element may, as described above, provide, on the basis of information other than any first information of a data packet or cell received, information relating to from which of the third ports to output the data packet or cell. In that situation, the providing step preferably comprises:
- comparing first routing information or other information from a received packet or cell to information in one or more of the entries in a memory means comprising a number of entries each comprising routing information and output port information, and
- identifying one or more entries having corresponding routing information, and
- providing output port information relating to the identified entry/entries.

Also, the providing step could comprise providing first routing information being an element selected from a predetermined group of information elements comprising a maximum number of elements being smaller than or identical to the number of entries of the memory means of the switching element.

The method could also comprise the steps of:
- determining whether a received data packet or cell comprises first routing information and, in that situation, deriving the first routing information and otherwise deriving other information from the packet or cell,
- dividing the memory means into a first group of entries wherein any entry/entries having routing information corresponding to first routing information is/are identified and a second group of entries wherein any entry/entries having routing information corresponding to other routing information is/are identified.

Then, the providing step could comprise providing first routing information being an element selected from a predetermined group of information elements comprising a maximum number of elements being smaller than or identical to the number of entries of the first group of entries of the memory means of the switching element.

As mentioned above, preferably:
- the first input/output ports are adapted to receive and transmit data packets or cells at a first bit rate to and from the external data network and
- the second input/output ports are adapted to receive and transmit data packets or cells at a second bit rate being larger than the first bit rate, and the third input/output ports are adapted to receive and transmit data packets or cells at the second bit rate.

A third aspect relates to a switching element for use in the above-mentioned system, and a fourth aspect relates to an I/O element for use in the above-mentioned system.

In the following, preferred embodiments of the invention will be described with reference to the drawing wherein:

FIG. 5 illustrates a second preferred embodiment according to the invention using one switching unit of the type seen in FIGS. 1–3.

Figure 1:
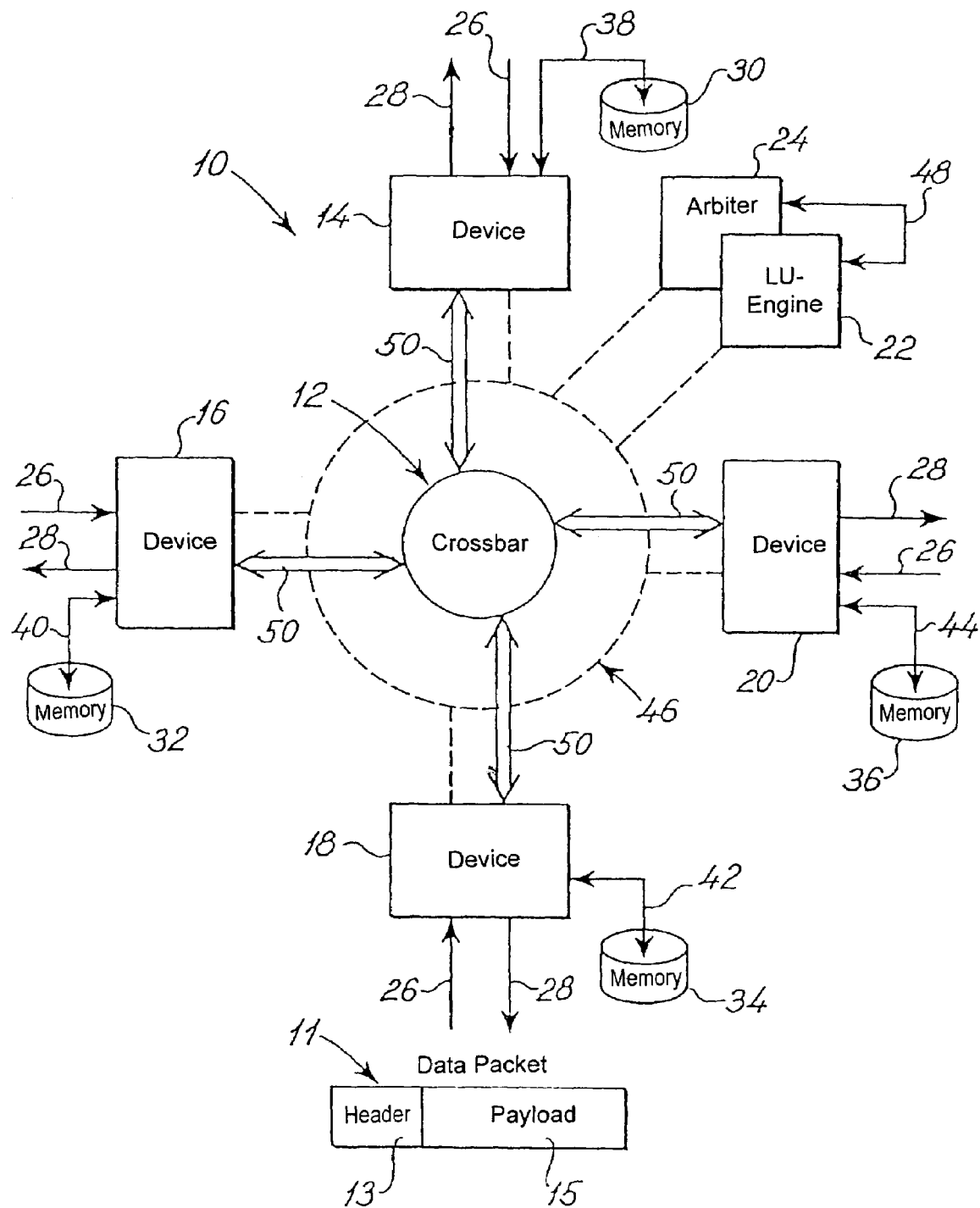
FIG. 1, shows a block diagram of a switching unit used in the I/O elements and the switching element in a preferred embodiment of the present invention.

FIG. 1 shows a block diagram of a switching unit for use in the preferred embodiment of the present invention, which switching unit is designated in its entirety by numeral 10. The switching unit 10 utilises a crossbar 12 for switching data packets 11 between devices 14, 16, 18 and 20, each data packet 11 comprising a header 13 and a payload 15. The header 13 may contain such information as destination address, source address and priority and the payload 15 may contain any data to be transmitted through a network.

In the following, a stand-alone device having a normal switching operation will be described. Thereafter, the preferred alternative operation will be described as a small variation over this normal operation.

The switching unit 10 comprises a crossbar 12 directing the data packets 11 received at any of the connected devices 14, 16, 18 or 20 to any or all of the connected devices 14, 16, 18 or 20; a lookup engine 22 (LU-engine) determining which of the devices 14, 16, 18 and/or 20 should receive the data packet 11; and an arbiter 24 determining from control information received from the LU-engine which of the devices 14, 16, 18 and/or 20 are to transmit and receive data packets 11 on the crossbar 12.

The LU-engine comprises a table or other data storage mapping external receiver addresses (such as MAC addresses or IP addresses) to internal receiving device identities—the devices via which the data packet may, in fact, reach its destination.

The data packets may be addressed to any specific device of the connected devices 14, 16, 18 or 20, addressed to a group of the connected devices 14, 16, 18 and/or 20 (multicasting), or alternatively addressed to all of the connected devices connected devices 14, 16, 18 and 20 (broadcasting).

Any number of devices 14, 16, 18 and/or 20 may be used in the switching unit 10. In the present embodiment, four devices 14, 16, 18 and 20 are described as being connected to the crossbar 12. In the preferred embodiment, actually 16 devices are used. However, the functionality is more easily understood with a smaller number of devices.

Each device 14,16,18 and 20 may further be connected to other switching units so as to receive and transmit data packets between further switching units. The communication within a switching unit is in this context referred to as internal communication and communication between switching units is in this context referred to as external communication.

The external communication is illustrated as inward and outward facing arrows 26 and 28 from each device 14,16, 18 and 20. The external communication generally has to submit to a standard configuration, such as IEEE 802.3. However the internal communication, that is, switching of data packets over the crossbar 12, may be implemented in accordance with any customer design requirements.

As data packets 11 are received at the devices 14, 16, 18 and 20, the devices 14, 16, 18 and 20 save the data packets in local memories 30, 32, 34 and 36 associated with each of the devices 14,16, 18 and 20 through respective connections 38, 40, 42 and 44.

Each of the devices 14,16,18 and 20 establishes a priority of the received packets and save the data packets in their respective local memories 30, 32, 34 and 36 in one of two queues—one for higher priority data and one for lower priority data.

The priority of a data packet stored in the local memories 30, 32, 34 and 36 is established by the devices 14, 16, 18 and 20 in accordance with the type of data packet e.g. new unknown data packet types are given high priority and known types of data packets are given a priority in accordance with a predefined priority level for the recognizable type. The various types of data packets may be recorded in local memories 30, 32, 34 and 36.

Upon request from the LU-engine, a device will generate a control header associated with the earliest received higher priority data packet or—if no higher priority data packets are stored, the earliest received lower priority data packet. The control header comprises such information as a destination and a source address copied from the header of the data packet and priority established by the receiving device on the basis of the contents of the entire data packet.

Figure 2:
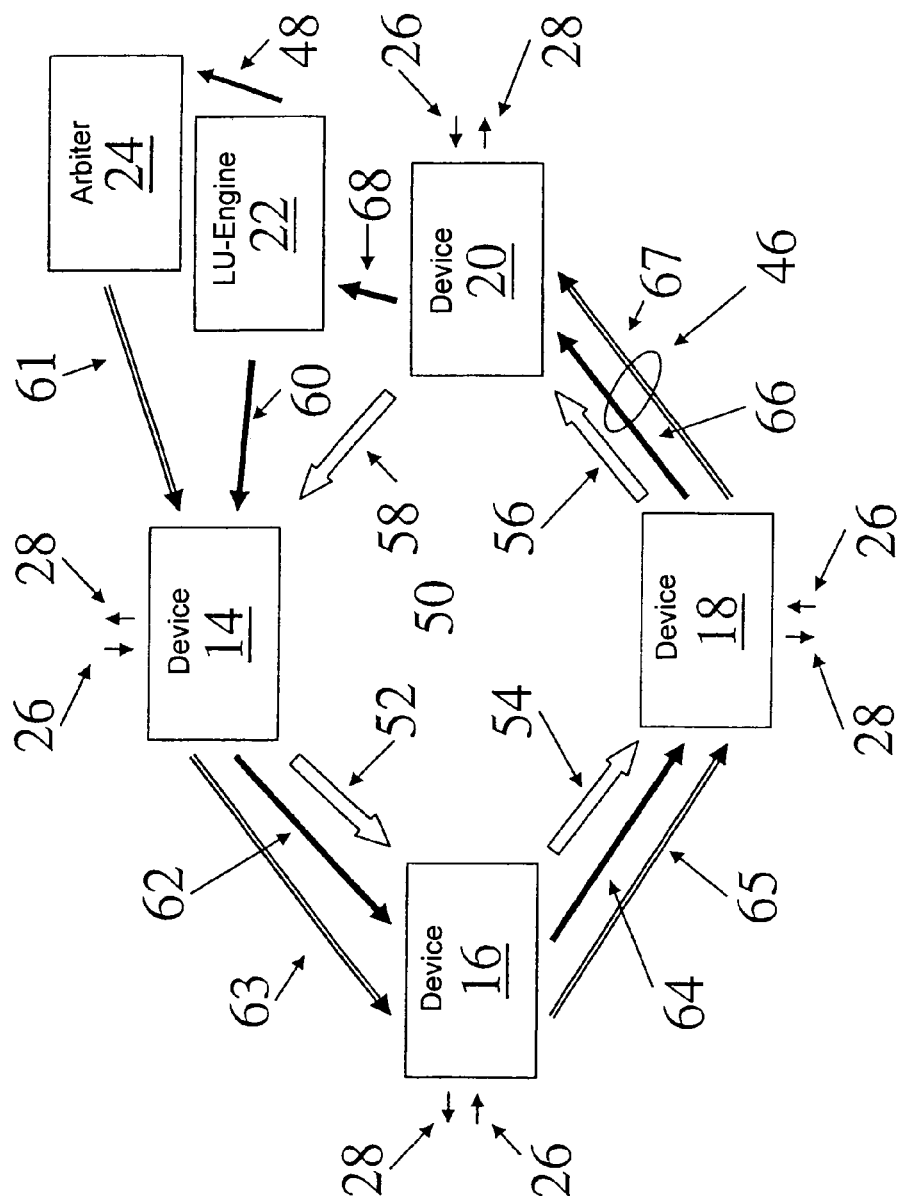
FIG. 2, shows a block diagram of the switching unit of FIG. 1.

Each of the devices 14, 16, 18 and 20 transmits and receives data packets over the crossbar 12 having a plurality of connections 50 which, in FIG. 2, are denoted 52, 54, 56, and 58. These connections 50 are shown in FIG. 1 as bi-directional arrows, hence devices 14, 16, 18 and 20 both receive and transmit to each other over the crossbar 12. A more detailed description of the internal communication between each of the devices 14, 16, 18 and 20 as well as the arbiter and LU-engine will be given below.

The arbiter 24 comprises, for each device, a buffer having four entries and in which controlling information received from the LU-engine 22 is present. When the buffer is not full for a given device, the arbiter 24 instructs the LU-engine 22 to request additional headers from the actual device. The requesting of the headers and the transmission of the headers (comprising DMAC, SMAC, length, priority, etc) is performed on lines 60, 62, 64, 66, and 68 forming part of a control connection 46.

The LU-engine 22 examines each control header and determines there from, which of the devices 14, 16, 18 and 20 should receive the associated data packets. The LU-engine 22 communicates, on the basis of the contents of each control header, forwarding information for each of the data packets received through a connection 48 to the arbiter 24. The forwarding information may contain information such as a bit mask identifying receiving device or receiving devices, source device and priority of the associated data packet.

The forwarding information from the LU-engine will be put into the pertaining buffer of the arbiter—and the arbiter will instruct the individual devices to output packets/cells in the order in which the headers enter the buffer. Each device keeps a record of the order in which headers are transmitted to the LU-engine. That order is maintained when switching the corresponding data packets.

Thus, the order of packets output from the higher and lower priority queues to the output queue may differ from that in which the device received those packets, but once the data packets have entered the buffer of the arbiter, the ordering is not changed.

The arbiter therefore knows which data packet is first in all buffers—which data packets are next to be transmitted—and the priorities thereof.

The arbiter instructs the individual devices to transmit by forwarding bit masks over links 61, 63, 65, and 67 also forming part of the control connection 46.

In the present embodiment, the devices are able to store a single data packet during each clock cycle. In that situation, the arbiter ensures that two devices are not allowed to forward packets to the same device at the same time. If two devices wish to transmit packets to the same device, one device will be instructed to forward its packet in the next cycle and one will not be instructed to forward the packet until a following cycle.

The arbitration performed in the arbiter may be of any suitable kind. One manner is to generate bitmaps describing which devices are able to receive data and which device wish to transmit to which device. Logical operations on these bitmaps will result in information relating to which devices may transmit in the next "turning of the wheel". Such operations may be performed for each priority.

FIG. 2 shows a detailed block diagram of an implementation of the crossbar 12 in the switching unit 10 according to the present embodiment. The configuration of the internal communication 50 between the devices 14, 16, 18 and 20 connected to the switching unit 10 utilises the unidirectional series connections 52, 54, 56 and 58 connecting the devices 14, 16, 18 and 20 in a ring shaped configuration. These connections are 277 bit wide busses and are used for transporting the data packets (256 bits) and bit patterns (21 bits) in parallel between the devices.

FIG. 2 further shows that the control connection 46 comprises the series connection, 60, 62, 64, 66, and 68, of the LU-engine 22 and the devices 14, 16, 18 and 20. These connections are used by the LU-engine to request from the individual devices (controlled by the arbiter buffers not being full) the control header of a highest priority data packet (or if all packets are of the same priority, that which was received first). These headers are also transmitted via these connections. These connections are 62 bits wide.

The result in the arbitration is a number of bitmaps to be transmitted—one for each device. The bitmap for a device informs the device whether the next data packet to be transmitted can be transmitted—and the bitmap comprises the receiving device information. The bitmap comprises 21 bits comprising 16 bits where a "1" at a given position is a sign to a given device that the data is for that device. The additional bits are controlling bits instructing the device to a.o. forward the next data packet/cell or an idle cell (if the device is, in fact, not allowed to transmit data). These bitmaps are transmitted from the arbiter along connections 61, 63, 65, and 67 also forming part of the control connection 46. These connections are 21 bits wide in order to transfer the bitmaps in parallel.

When a device receives a bitmap, the bitmap is added as a header to the data (the next data packet or an idle cell) and transmitted along the connections 52, 54, 56, and 58.

The presently preferred embodiment is adapted to handle Ethernet packets. Such packets have varying lengths (64–1522 bytes—and up to 64 kilo bytes) whereby the devices are adapted to subdivide these into fixed-size cells.

The control header transmitted to the LU-engine and further to the arbiter comprises information relating to the length of the packet whereby the arbiter is able to determine over how many cells the packet is transmitted. In that manner, the arbiter ensures that all cells of a data packet are transmitted between devices in order—even though it is not required that one cell is transmitted each super cycle (see below). Each cell comprises 256 bits so that it may be transmitted in parallel between the devices.

In this situation, the arbiter will keep transmitting the same bit mask to a device until all cells of a data packet have been transmitted. There is nothing preventing this transmission from being interrupted if higher priority data traffic so demands.

The switching unit 10 according to the preferred embodiment may be implemented on a single chip for performing switching operations for elements presented on the single chip e.g. separate sections of a chip each performing various or multiple operations on data which need to be transferred between sections. In fact, as will be clear from the following, all devices may be implemented identically, which greatly facilitates the development and manufacture of the present switch.

The actual timing of the switching is the following:

The operation is performed in super cycles being (in the illustrated embodiment having four devices) four clock cycles.

Independently of this clock, the arbiter constantly controls the LU-engine to request control headers in order to keep the arbiter buffers full.

During one super cycle, the arbiter will determine, from the forwarding information in its buffers which relates to the data packets which are the first to be transmitted from each device, which devices are allowed to forward the first packet in its output queue in a future super cycle. Also, the arbiter will generate corresponding bit patterns. In a next super cycle, the arbiter will forward these bitmaps to the devices—simultaneously with the shifting of previously determined data cells.

During the following super cycle, the selected devices will, on the basis of the bitmaps received in the previous super cycle, forward their data packet to the next device which will forward its own, previous data packet, receive the new data packet, analyse it, and store a copy if the packet is for the relevant device—and amend the bit mask relating to the data packet prior to transmission. This is performed once every clock cycle in order for the data packets to be shifted a full circle during that super cycle. During this super cycle, the LU-engine and arbiter prepare the next super cycles by determining which data packets to transmit next and by forwarding bit patterns.

In this respect, the bitmap transmitted to a given device will take into account in which device it is—in order for the shifting (left or right) to bring the correct "0"s and "1"s to a predetermined position in the correct devices. In this manner, all devices may check the same position in the bitmap in order to determine whether the data is for the actual device.

In the preferred embodiment, as described above, 16 devices are actually used whereby the super cycle consists of 16 clock cycles—using a 125 MHz clock (clock cycle of 8 ns).

Table 1 below illustrates how the data packets are shifted from device to device over the crossbar 12 within the switching unit 10. The devices 14, 16, 18 and 20 each provide a data packet to the crossbar during the first cycle or the synchronization cycle. The device 14 adds a data packet (D14-rx-data) destined for device 18. This data packet is shifted to the next device in accordance with each new cycle i.e. during the second cycle to device 16 and during the third cycle to device 18. The data packets are shifted round the crossbar 12 concurrently with the shifting of an associated bit mask identifying receiving device or devices on the control connection 40, illustrated in table 1 in the destination field. When the data packet reaches a destined device, the destined device may remove itself as receiver of the data packet by altering the bit mask on the control connection 40. This is illustrated in table 1 as the data packet (D14-rx-data) during the third cycle reaches its destination, namely device 18, the device 18 saves the data packet (D14-rx-data) and alters the bit mask on the control connection 40. The following fourth cycle shows that the data packet (D14-rx-data) is shifted from device 18 to device 20 and the destination on the control connection 40 is None.

Alternatively, a data packet may be destined for more than one device. The device 16 adds a data packet (D16-rx-data) during the synchronization cycle, which data packet (D16-rx-data) is destined for devices 14 and 20. The data packet (D16-rx-data) reaches device 20 during the third cycle in which the device 20 saves the data packet (D16-rx-data) and alters the associated bit mask on the control connection 40 by removing itself as a destination. During the following cycle, the fourth cycle, the data packet (D16-rx-data) is further shifted to the device 14. The device 14 saves the data packet (D16-rx-data) during the fourth cycle.

TABLE 1

| Cycle | Data (DA) Destination (DE) | Device 14 | Device 16 | Device 18 | Device 20 |
|---|---|---|---|---|---|
| 1 | DA | D14-rx-data | D16-rx-data | D18-rx-data | D20-rx-data |
|   | DE | D18 | D14, D20 | N/A | D16 |
| 2 | DA | D20-rx-data | D14-rx-data | D16-rx-data | D18-rx-data |
|   | DE | D16 | D18 | D14, D20 | N/A |
| 3 | DA | D18-rx-data | D20-rx-data | D14-rx-data | D16-rx-data |
|   | DE | N/A | D16 | D18 | D14, D20 |
| 4 | DA | D16-rx-data | D18-rx-data | D20-rx-data | D14-rx-data |
|   | DE | D14 | N/A | None | None |

The arbiter 24 may disable transmission of data packets on to the crossbar 12 from any of the devices 14, 16, 18 and 20 if the receiving device is or receiving devices are unable to receive any data packets. In this case the device will place a dummy data packet on the crossbar 12—a dummy packet with no receiving device. Table 1 illustrates this by having device 18 adding during the first cycle a data packet which cannot be received by intended receiving device or devices, hence the destination address is set to N/A.

Figure 3:
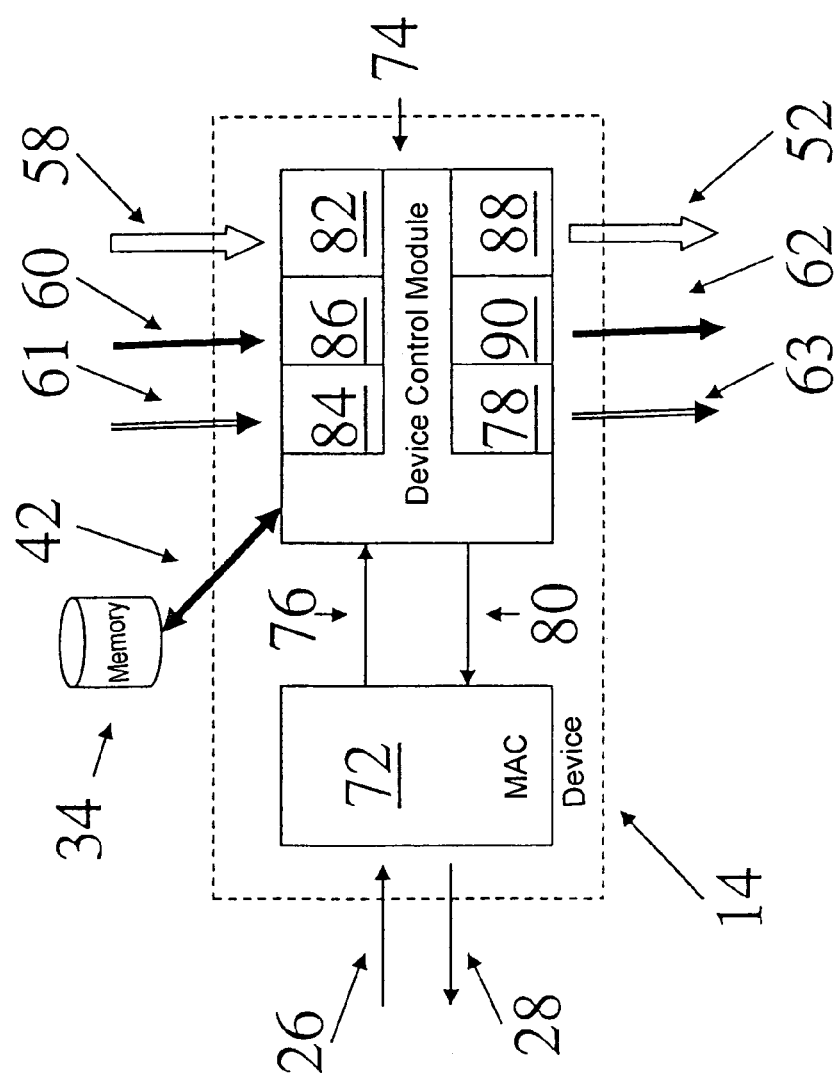
FIG. 3, shows a block diagram of a device connected to a crossbar in the switching unit of FIG. 1.

FIG. 3 shows a detailed block diagram of the device 14 connected to the crossbar 12 in the switching unit 10. The device 14 comprises a medium access controller 72 (MAC) for receiving data packets from and transmitting data packets to a multi-access channel network such as a local area network (LAN) or a metropolitan area network (MAN). The MAC 72 receives externally communicated data packets through the connection 26 and transmits data packets through the connection 28, while ensuring that the data packets avoid colliding with data packets already on the external multi-access channel network. The MAC 72 may utilise any protocol for controlling transmission on the multi-access channel network e.g. any IEEE standard or any particular custom or company requested standard. In an alternative embodiment of the switching unit 10, the device 14 may perform external point-to-point transmission through the connections 26 and 28 and therefore for this alternative embodiment a MAC is unnecessary in a device, since in point to point communications collisions are substantially avoided.

When the MAC 72 identifies a data packet for the switching unit 10 on the external network, that is, on the connections 26 or 28, the MAC 72 communicates the data packet to a device control module 74 through connection 76. The device control module 74 establishes a priority and temporarily stores the data packet in the local memory 34, which comprises the two priority queues. Additionally, the device control module 74 selects from the local memory 34 the highest priority data packet and forwards the pertaining control header on connection 62 via buffer 90 when having received a request on connection 60 via buffer 86. The control header may contain information such as the destination address, source address and the priority of the highest priority data packet. Subsequently the LU-engine receives this information from the control output buffer 90 and appropriately communicates enough information to the arbiter so that the arbiter may perform arbitration. On the other hand the MAC 72 receives data packets to be transmitted from the switching unit 10 through connection 80.

The data received in buffer 82 comprises a pertaining bit mask which the module 74 analyses (the value at a given position) in order to determine whether the data in the receiving buffer 82 is intended for the device 14. The data packet is communicated from the receiving input buffer 82 to a transmitting output 88 and the bit mask signal is altered. If the device control module 74 establishes from the bit mask signal that the data packet in the receiving input buffer 82 is intended for the device, the device control module 74 saves the data packet in the receiving input buffer 82 in the local memory 34 through connection 42.

The device control module 74 alters the bit mask signal in the input control buffer 82 before communicating the bit mask signal to the control output buffer 88. The alteration is accomplished by the device control module 74 shifting the bit mask signal either left or right in the input control buffer subsequent to the device control module 74 having established whether the associated data packet in the receiving input buffer 82 is intended for the device 14. Thus the device control module 74 of each of the devices connected to the crossbar shifts the bit mask signal in input control buffers by one bit before transmitting the bit mask signal and the associated data packet on to the crossbar. Hence enabling the next device control module of the next device connected to the crossbar to establish whether a data packet is intended for the device by examining the same bit position in the input control buffer 82. This simplifies the design procedure of the switching unit since all the devices connected to the crossbar are identical.

During each cycle, the device control module 74 receives, in a receiving input buffer 84, bitmap for the next super cycle. This bitmap is forwarded unamended to buffer 78 and further along the connection 63 until the data on the ring 50 has been rotated a full circle. Then, the bitmaps on the connections 61, 63, 65, and 67 have been rotated to the correct devices. These bitmaps are then analysed in order for the device to determine whether to send a data cell or an idle cell. The pertaining cell is copied to the buffer 88 and the bit mask appended as a header. This data is then forwarded on the ring 50 in the following super cycle.

The local memories 30, 32, 34 and 36 connected to the devices 14, 16, 18 and 20 reduce head of line blocking. If a plurality of data packets is received at any of the devices 14, 16, 18 and 20, the device control module 74 will communicate the data packet to the local memory 34. The data packets having highest priority are transmitted at the earliest free synchronisation cycle and the data packets having lowest priority are transmitted when no high priority data packets are stored in any particular local memory of the local memories 30, 32, 34 and/or 36. The general order of transmitting high or low priority data packets from the local memories 30, 32, 34 and 36 may be made in accordance with any particular desired order such as first in first out or first in last out.

As described above, the device 14 implementing the quality of service establishes the priority of the data packet. By default the device 14 designates high priority to incoming data packets. The general method for implementing quality of service is by analysing a data packet and increasing priority level of the data packet as the analysis progresses. In this embodiment of the present invention the device 14 initially provides the data packet with highest priority and as the data packet is analysed by the device 14 the priority level is lowered if the data packet is identified as being a non-high priority data packet. In one embodiment the device 14 initiates a tree structure analysis of the data packet. If the device 14 at the first level recognises the type of data packet the high priority is reduced otherwise the high priority is maintained. If the device 14 at the next level recognises the type of data packet the high priority level is reduced otherwise the high priority is maintained and so on. The device 14 thus provides unknown types of data packets with the highest priority and provides known types of data packets with priorities, which are in accordance with established priority for the particular type of data packet.

The preferred "source routing" operation of the invention is a small variation over this standard operation in that the information transmitted to the look-up engine is not the addresses of the header of a received packet. Instead, it is determined whether the packet comprises the first routing information. This information is now transmitted to the look-up engine (e.g. together with the other relevant information such as priority and packet length—and preferably also the ID of the receiving port) and the look-up engine is now adapted to search in the storage after the routing information provided. The output of the look-up engine and the remainder of the operation of the switching element may be exactly the same.

The reason for the adding of the receiving port ID to the information to the LU engine is seen when the same tag is used for communication between two end stations. Thus, the LU engine should be able to see a difference between the communications in the two directions.

A mixed operation is also possible where the information transmitted to the look-up engine is either first routing information or the standard addresses. The look-up engine will determine which type of information it is and treat them as described above: the first routing information is sought for in part of the memory structured accordingly and the address information is sought for in another part of the memory structured in the normal way.

The present routing information (which may be added to the data packet or cell in a preamble thereof or in a header thereof—such as as a tag) may be taken as comprising a number of different types of information: traffic type, priority, source port ID, traffic route (where different routes—a faster and a slower, e.g.—may be used for different priorities or traffic types).

Figure 4:
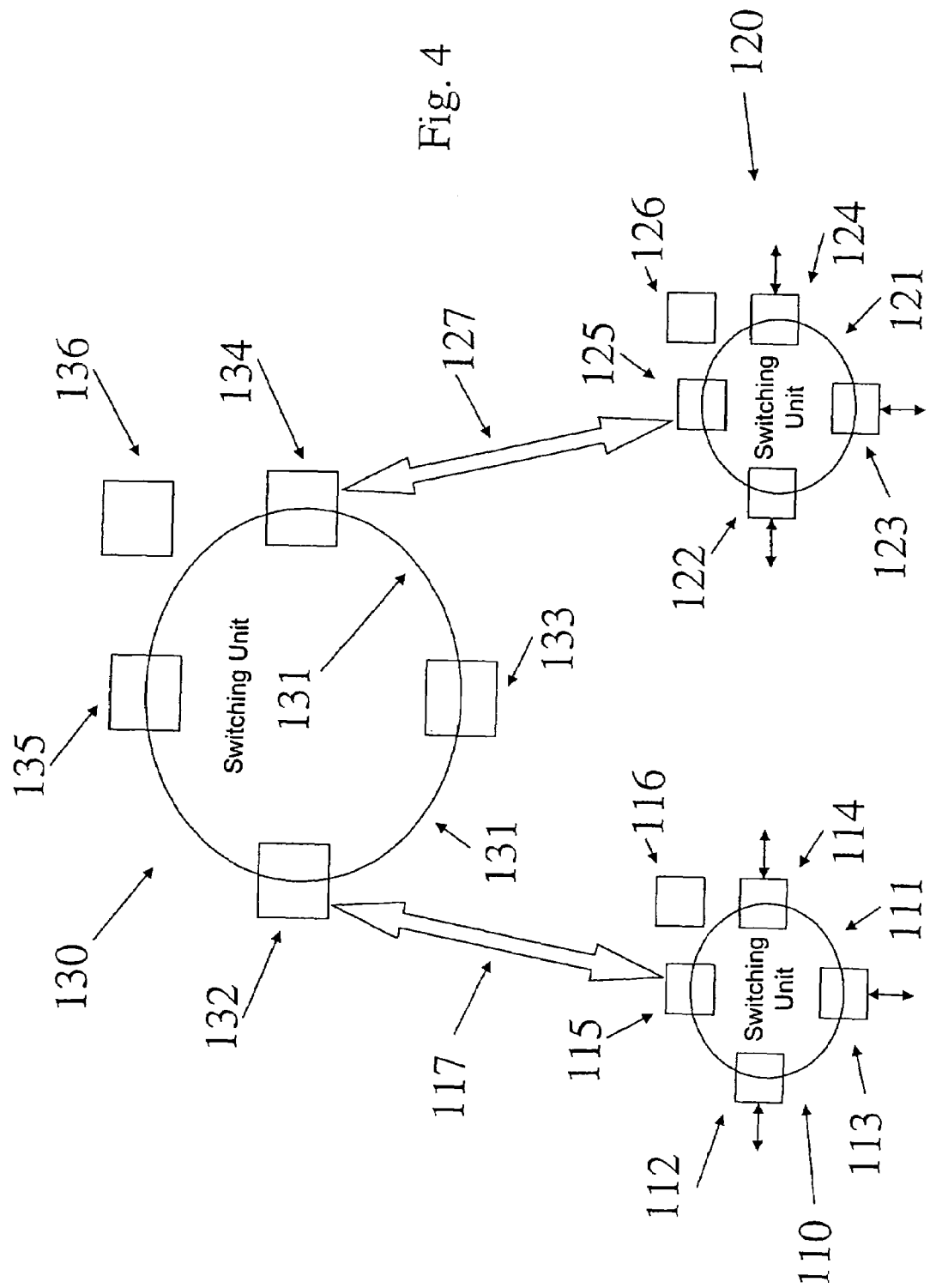
FIG. 4 illustrates a first preferred embodiment according to the invention using a number of switching units of the type seen in FIGS. 1–3.

FIG. 4 illustrates a preferred embodiment of the invention where, in fact, three switching units as that described in relation to FIGS. 1–3 are used. The individual I/O elements, 110 and 120, comprise a number of devices or ports 112, 113, 114, 115, 122, 123, 124, and 125, as well as determining means (arbiter and look-up engine) 116 and 126. As described in relation to FIGS. 1–3, any number of ports may be used on the ring structures 111 and 121.

In the present embodiment, the ports 115 and 125 are 10 Gbit/s ports whereas the other ports are 1 Gbit/s ports or triple-speed ports.

One manner of providing ports or devices of two different bit rates on the same ring structure may be to actually bundle or aggregate e.g. 10 1 Gb/s ports on the ring structure into a single 10 Gb/s input/output port.

The LU-engines of the I/O elements have a slightly enhanced function which will be described further below.

The switching element 130 also has a number of ports, now e.g. only 10 Gb/s ports 132, 133, 134, and 135 on a ring structure 131. The bit rate of a ring structure (such as that of 111) may be increased (to that of 131) by increasing the width thereof (increasing the amount of data which may be shifted in parallel thereon) and/or by increasing the clock of the system.

Also, in order to be able to function as a standalone switch, the switching element 130 also has a determining means (arbiter and LU-engine) 136. The arbiter will be required at all times but the LU-engine will be used differently when used according to the invention and when used as a standalone switch.

Thus, the I/O elements 110 and 120 and the switching element 130 may each be configured as standalone switches—but with different capabilities. The I/O elements being e.g. so-called 24+1 (24 1 Gbit/s ports and 1 10 Gbit/s port or uplink), whereas the switching element may be e.g. a 4×10 Gbit/s switch.

However, when being combined into the present combination, the ports 125 and 115 are connected to ports 134 and 132, respectively, and the LU-part of the determining means 136 is altered as described above due to the fact that the switching/routing information is present in the data cells received from the I/O elements 110 and 120.

In this manner, the determining means 116 and 126 will be adapted to provide information not only relating to via which port of the I/O element a received data packet is to be output from but also, if it is determined that the packet needs to be switched to another I/O element via the switching element 130, information on which port of the element 130 the packet needs to be output in order to arrive at the correct I/O element(s).

This requires a simple enhancement of the LU-function described above in that the information held by the LU-table simply has to be increased.

In fact, the actual LU-table may provide not only the routing information for the switching element 130 but also from which port of the receiving I/O element the packet should be output to the surrounding data network. Again, this may be a simple increasing of the size of the LU-table of the I/O elements. Alternatively, the same information may be used in all subsequent elements, so that not even an increase in the table size is required.

The I/O elements and switching element being capable of standalone operation, the cells of a data packet will be reassembled as a data packet before transmission on the links 117 and 127.

The invention claimed is:

1. A data switching system comprising:
   one or more I/O elements each comprising:
      a plurality of first input/output ports configured to receive and transmit data packets or cells to and from an external data network;
      one or more second input/output ports configured to receive and transmit data packets or cells;
   routing device configured to provide a first routing information indicating at least one data packet or cell to be transmitted from one or more of the second ports; and
   an arbiter configured to transmit a bitmap to the one or more I/O elements, where the bitmap comprises information for enabling or disabling the transmitting and/or receiving of data packets or cells by the one or more I/O elements;
   wherein each of the one or more I/O elements is configured to transfer data packets or cells between the first ports and the second ports and to transmit data packets or cells comprising corresponding first routing information from the second ports;
   a switching element having a plurality of third input/output ports configured to receive and transmit data packets or cells, the switching element comprising means for:
      receiving on a third port a data packet or cell as well as the corresponding first routing information;
      determining, on the basis of the first routing information, port information for the data packet or cell indicating which of the third ports is to transmit the data packet or cell; and
      transmitting the data packet or cell from the third ports indicated by the port information;
   wherein a second port of each of the one or more I/O elements is connected to a third port of the switching element.

2. A system according to claim 1, wherein the routing device is configured to provide a second information, based on information derived from a particular data packet or cell received in a first I/O element from the external data network, indicating which of the first ports of a second I/O element, having received the particular data packet or cell from an indicated third port of the switching element, is to transmit the particular data packet or cell.

3. A system according to claim 2, wherein the second information is transmitted from the first I/O element to the second I/O element.

4. A system according to claim 3, wherein the second information is introduced into the particular data packet or cell by the first I/O element and the second I/O element is configured to derive the second information from the particular data packet or cell.

5. A system according to claim 1, wherein the one or more I/O elements is configured to transmit data packets or cells between the first and second ports, and wherein the routing device is configured to provide a third information, derived from a particular data packet or cell received in the at least one I/O element from the external data network, indicating whether to:
- transmit the particular data packet or cell from one of the first ports of the one or more I/O elements and/or
- transmit the particular data packet or cell to the switching element via a second port of the one or more I/O elements.

6. A system according to claim 2, wherein the first and any second information is added to the data packet or cell.

7. A system according to claim 6, wherein the information is added as at least part of a preamble of the data packet or cell comprising a preamble, a header, and a payload.

8. A system according to claim 6, wherein the information is added as at least part of a header of the data packet or cell comprising a preamble, a header, and a payload.

9. A system according to claim 1, wherein each I/O element comprises a routing device.

10. A system according to claim 1, wherein each of the first, second, and third ports comprises an I/O means for transmitting and receiving data packets or cells conforming to a predetermined standard.

11. A system according to claim 10, wherein the I/O means of the second and third ports is configured to operate in one of two modes: one mode comprising transmission and reception of data packets or cells conforming to the predetermined standard; and the other mode comprising transmission and reception of data packets or cells comprising the first and/or second information.

12. A system according to claim 1, wherein the determining means of the switching element further comprises means for providing, on the basis of information other than the first information of a data packet or cell received, information indicating which of the third ports is to transmit the data packet or cell.

13. A system according to claim 12, wherein the providing means of the switching element further comprises:
- a memory means comprising a number of entries each comprising routing information and output port information; and
- means for:
  - comparing first routing information or other information from a received data packet or cell to information in one or more of the entries in the memory;
  - identifying one or more entries having corresponding routing information; and
  - providing output port information indicating the identified entry/entries.

14. A system according to claim 13, wherein the routing device is configured to provide first routing information, wherein the first routing information is an element selected from a predetermined group of information elements comprising a maximum number of elements which are smaller than or identical to the number of entries of the memory means of the switching element.

15. A system according to claim 13, wherein the switching element further comprises means for determining whether a received data packet or cell comprises first routing information and for, in that situation, deriving the first routing information or otherwise deriving other information from the data packet or cell; and wherein the memory means of the switching element is divided into a first group of entries wherein any entry having routing information corresponding to first routing information is identified and a second group of entries wherein any entry having routing information corresponding to other routing information is identified.

16. A system according to claim 15, wherein the routing device is configured to provide first routing information comprising an element selected from a predetermined group of information elements comprising a maximum number of elements which are smaller than or identical to the number of entries of the first group of entries of the memory means of the switching element.

17. A method of switching data, the method comprising:
- receiving a data packet or cell in a first I/O element comprising:
  - a plurality of first input/output ports configured to receive and transmit data packets or cells to and from an external data network; and
  - one or more second input/output ports configured to receive and transmit data packets or cells;
  - wherein the first I/O element is configured to transfer data packets or cells between the plurality of first ports and the one or more second ports;
- transmitting a bitmap to an I/O element, where the bitmap comprises information for enabling or disabling the transmitting and/or receiving of data packets or cells by the I/O element;
- providing first routing information indicating at least one data packet or cell to be transmitted from the one or more second ports;
- transmitting the at least one data packet or cell comprising the first routing information from the one or more second ports of the first I/O element;
- receiving the transmitted at least one data packet or cell and first routing information in a switching element having a plurality of third input/output ports configured to receive and transmit data packets or cells;
- determining, on the basis of the first routing information, port information indicating which of the plurality of third ports is to transmit the at least one data packet or cell; and
- transmitting the at least one data packet or cell from the plurality of third ports indicated by the port information.

18. A method according to claim 17, further comprising providing second information, based on information derived from a data packet or cell received in the first I/O element from the external data network, indicating which of the first ports of a second I/O element, having received the data packet or cell from an indicated third port of the switching element, is to transmit the data packet or cell.

19. A method according to claim 18, wherein the second information is transmitted from the first I/O element to the second I/O element.

20. A method according to claim 19, wherein the second information is introduced into the data packet or cell by the first I/O element, and wherein the second I/O element derives the second information from the data packet or cell.

21. A method according to claim 17, wherein at least one I/O element is configured to transmit data packets or cells between the first and second ports and wherein the method further comprises providing third information, derived from a data packet or cell received in the first I/O element from the external data network, indicating whether to:
- transmit the data packet or cell from one of the first ports of the at least one I/O element and/or
- transmit the data packet or cell to the switching element via a second port of the at least one I/O element.

22. A method according to claim 17, further comprising adding the first and any second information to the data packet or cell.

23. A method according to claim 22, wherein adding comprises adding the information as at least part of a preamble of the data packet or cell comprising a preamble, a header, and a payload.

24. A method according to claim 22, wherein adding comprises adding the information as at least part of a header of the data packet or cell comprising a preamble, a header, and a payload.

25. A method of transmitting or receiving data packets or cells according to claim 17, further comprising transmitting and receiving data packets or cells to and from each of the first, second, and third ports conforming to a predetermined standard.

26. A method according to claim 25, further comprising operating the second and third ports in one of two modes, one mode comprising transmission and reception of data packets or cells conforming to the predetermined, standard and the other mode comprising transmission and reception of data packets or cells comprising the first and/or second information.

27. A method of determining information according to claim 17, further comprising determining, on the basis of information other than any first information of a data packet or cell received, information indicating which of the third ports is to transmit the at least one data packet or cell.

28. A method of determining information according to claim 27, wherein determining comprises:
   comparing first routing information or other information from a received data packet or cell to information in one or more of the entries in a memory means comprising a number of entries each comprising routing information and output port information;
   identifying one or more entries having corresponding routing information; and
   providing output port information indicating the identified entry/entries.

29. A method according to claim 28, wherein determining further comprises providing first routing information comprising an element selected from a predetermined group of information elements comprising a maximum number of elements which are smaller than or identical to the number of entries of the memory means of the switching element.

30. A method according to claim 28, further comprising the steps of:
   determining whether a received data packet or cell comprises first routing information and, in that situation, deriving the first routing information, or otherwise deriving other information from the data packet or cell; and
   dividing the memory means into a first group of entries wherein any entry having routing information corresponding to first routing information is identified and a second group of entries wherein any entry having routing information corresponding to other routing information is identified.

31. A method according to claim 30, further comprising providing first routing information comprising an element selected from a predetermined group of information elements comprising a maximum number of elements which are smaller than or identical to the number of entries of the first group of entries of the memory means of the switching element.

32. A switching element for use in the system according to claim 1.

33. An I/O element for use in the system according to claim 1.

* * * * *